United States Patent [19]

Burkett

[11] 4,056,286
[45] Nov. 1, 1977

[54] REMOTE CONTROL BRAKE SYSTEM FOR A RAILWAY TRAIN

[75] Inventor: Richard O. Burkett, Apollo, Pa.

[73] Assignee: Westinghouse Air Brake Company, Wilmerding, Pa.

[21] Appl. No.: 693,776

[22] Filed: June 8, 1976

[51] Int. Cl.$^2$ ............................................. B60T 13/68
[52] U.S. Cl. ........................................ 303/20; 105/61; 303/3; 303/15
[58] Field of Search ............. 105/61; 188/3 R; 303/3, 303/15, 20, 7, 25, 65, 66, 85; 318/16, 600, 601; 325/37, 314, 390, 392; 340/47, 48, 53

[56] References Cited

U.S. PATENT DOCUMENTS

| | | | |
|---|---|---|---|
| 3,507,542 | 4/1970 | Cannella | 303/15 X |
| 3,588,186 | 6/1971 | Worbois | 303/20 |
| 3,790,225 | 2/1974 | Wehde | 303/20 X |
| 3,871,718 | 3/1975 | Würth | 303/20 X |

Primary Examiner—Stephen G. Kunin
Attorney, Agent, or Firm—R. W. McIntire, Jr.

[57] ABSTRACT

A radio controlled remote brake system for a railway train having a caboose equipped with a motor driven pressure regulating valve device and an equalizing reservoir that is charged from the train brake pipe pressure via the regulating valve device. When a brake application is made at the locomotive by operating the conventional engineer's brake valve device, a radio signal corresponding to the brake valve position is transmitted to the caboose where it is compared with a feedback signal corresponding to the instantaneous position in which the caboose regulating valve is set by its drive motor. When the brake control and feedback signals match, the caboose regulating valve is set to effect a reduction of the caboose equalizing reservoir pressure in accordance with the locomotive equalizing reservoir pressure reduction resulting from operation of the engineer's brake valve device. During brake release and charging, an initialization circuit controls the regulating valve drive motor so that the regulating valve is set to the caboose brake pipe pressure when the brake pipe is fully charged. Due to brake pipe gradient, this setting differs from that of the locomotive brake valve and is compensated for by a gradient memory circuit which modifies the feedback signal so that the degree of pressure adjustment provided by the caboose regulating valve matches that of the locomotive. A relay valve device at the caboose operates in response to a reduction of caboose equalizing reservoir pressure to provide a reduction of caboose brake pipe pressure corresponding to the reduction of brake pipe pressure at the locomotive.

20 Claims, 3 Drawing Figures

Fig. 3

REMOTE CONTROL BRAKE SYSTEM FOR A RAILWAY TRAIN

BACKGROUND OF THE INVENTION

The present invention is related to radio controlled, railway train brake systems and particularly to such systems in which the train locomotive and caboose are equipped to concurrently establish a reduction of the train brake pipe pressure from opposite ends at the time of a brake application.

Heretofore, remote brake control systems for railway trains have relied upon radio transmission of a brake control signal for a time duration predicated upon the degree of brake application desired. Fluid pressure in an equalizing reservoir at the caboose corresponding in size to the locomotive equalizing reservoir is vented via an orifice having a flow capacity corresponding to the flow capacity of an orifice via which the locomotive equalizing reservoir pressure is vented. Since the duration the equalizing reservoir pressure reduction occurs at the locomotive corresponds to the duration of the transmitted brake control signal, the caboose equalizing reservoir pressure reduction is intended to correspond to the reduction at the locomotive, with the resultant degree of brake pipe reduction and thus the brake application effective at each car of the train being substantially equal. In that these flow orifices are thus critical in obtaining equal braking along the train, it will be appreciated that accumulation of dirt or other foreign matter around these orifices can have an adverse effect on the operation of the brake control system. Furthermore, a brake control signal transmitted on a timed basis according to the desired brake application has the disadvantage of being inaccurate as a result of any temporary loss of radio communication, which is not uncommon.

SUMMARY OF THE INVENTION

One object of the invention is to employ a conventional engineer's brake valve device and means for sensing the brake valve handle position at the locomotive for providing a brake control signal that is transmitted to the caboose to obtain a corresponding variation of brake pipe pressure at the locomotive and caboose.

Another object of the invention is to vary the pressure setting of a regulator valve at the caboose by means of an electric servo motor, in order to effect reductions of brake pipe pressure at the caboose in accordance with the degree of brake application initiated at the locomotive.

An extension of the above object is to employ a stepping type motor to control the caboose regulating valve in accordance with the transmitted brake control signal without accumulating errors due to the motor inertia and response characteristics.

Yet another object of the invention is to charge a control reservoir at the caboose from the train brake pipe pressure in order to eliminate the need for a compressor at the caboose.

Still another object of the invention is to initialize the system during initial brake pipe charging by pre-setting the position of the caboose pressure regulator in accordance with the brake pipe pressure at the caboose and to monitor this pressure setting of the regulator valve as a means of compensating for brake pipe gradient in order to assure that the caboose brake pipe reduction corresponds to the locomotive brake pipe reduction.

A final object of the invention is to prevent an inadvertent release of the reaar end brakes when a brake application is initiated prior to the rear end brake pipe pressure being fully charged.

In carrying out these objects, there is provided in association with the locomotive brake valve device an encoder in the form of a rotary switch device that monitors the brake valve handle position to provide a brake command code signal that is transmitted by radio to the remote unit, the brake command signal being representative of the brake valve handle position between full release and full service positions in the brake application zone.

The transmitted brake command signal is received at the caboose and interpreted by a logic unit that feeds a corresponding code signal to a first comparator whose output energizes a stepping motor. The setting of a pressure regulator valve device is adjusted by the stepping motor until an encoder similar to the brake valve encoder produces a feedback signal to the comparator that matches the brake command code signal. When the comparator output subsequently disappears, the pressure regulator valve operation is terminated at a new pressure, in accordance with which setting the pressure is an equalizing reservoir at the caboose is adjusted. A relay valve device responsive to the caboose equalizing reservoir pressure in turn controls the reduction of brake pipe pressure at the caboose in accordance with a reduction initiated at the locomotive when the brake command signal results from a brake application.

When the brake command signal results from a brake release control operation, handle movement of the locomotive brake valve device toward release position produces an output code signal at the first comparator indicating a brake command corresponding to a pressure setting different than that of the caboose pressure regulator. The sense of this difference causes the stepping motor to operate the pressure regulator to a higher pressure setting in which brake pipe pressure is supplied to the caboose equalizing reservoir. At this pressure in the caboose equalizing reservoir is gradually increased above the regulating valve pressure setting, the regulating valve will begin to exhaust the overcharge via a flow detector switch which causes the stepping motor to again operate the pressure regulator to a higher pressure setting so that in continuing this process while brake pipe pressure is being charged from the locomotive, the setting of the regulating valve tends to closely follow the caboose brake pipe pressure in order to provide an accurate indication of the caboose brake pipe pressure and thus the brake pipe gradient when final charging of brake pipe pressure is completed.

A memory circuit to which the encoder associated with the caboose pressure regulator is connected stores a code signal corresponding to the final setting of the pressure regulator and feeds this memory signal to a second comparator where it is subtracted from the code signal from the encoder as the caboose pressure regulator valve setting is subsequently adjusted during brake applications. In this way, the second comparator modifies the aforementioned feedback signal to the first comparator in accordance with the brake pipe gradient in order to assure that the pressure regulator setting corresponds to a pressure that is less than that provided by the locomotive brake valve by an amount corresponding to the detected brake pipe gradient. In this way, the system takes into account the brake pipe gradient and still produces a brake pipe reduction at the caboose corresponding to the reduction initiated at the locomotive.

Other objects and advantages of this invention will become apparent from the following more detailed explanation when taken with the accompanying drawings in which:

DESCRIPTION AND OPERATION

Figure 1:
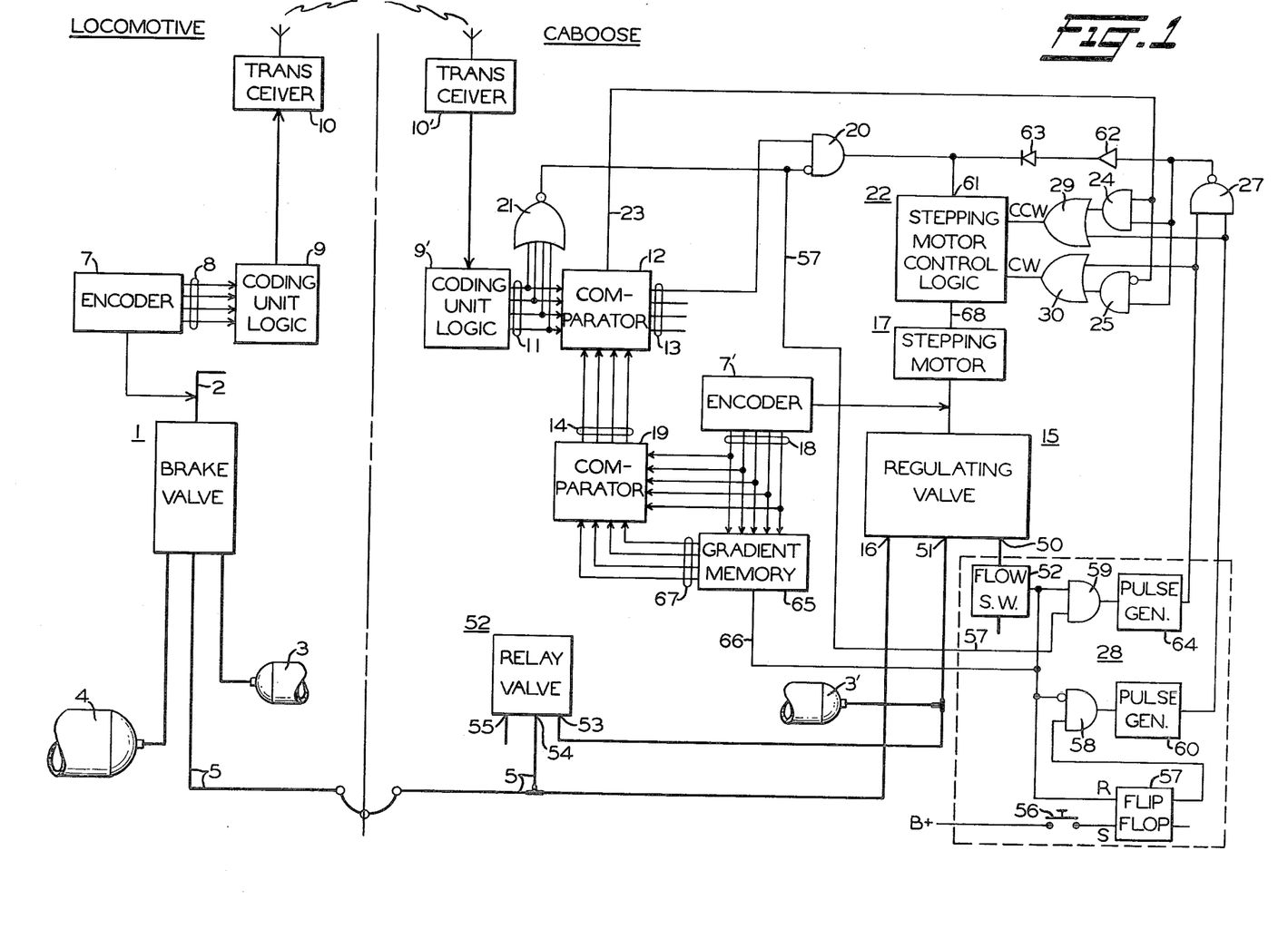
FIG. 1 shows a block diagram of the brake control system comprising the invention.
Figure 2:
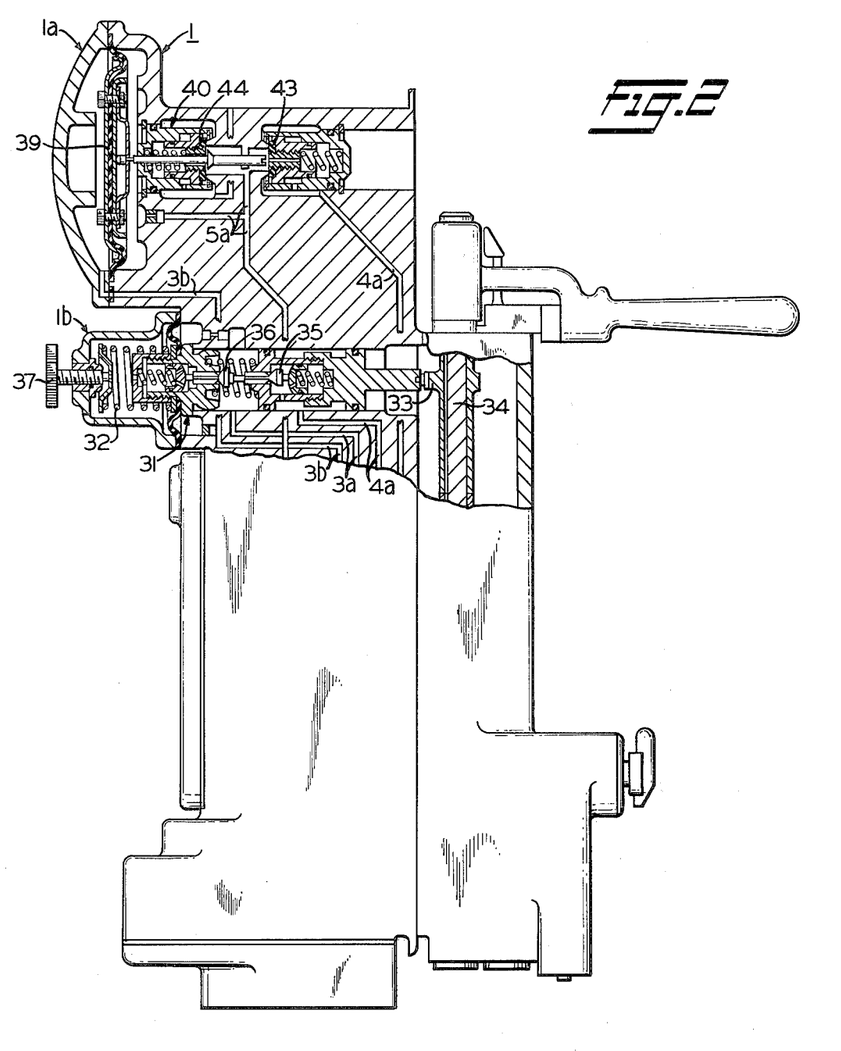
FIG. 2 is a partial sectional view showing details of the relay and regulating valve portions of a conventional engineer's brake valve device.

Referring now to FIG. 1 of the drawings, there is shown to the left of the dashed centerline the locomotive brake control equipment and to the right of the centerline the caboose brake control equipment. Included in the locomotive equipment is a conventional engineer's brake valve device 1 having a handle 2 which is manually operable for controlling a plurality of cam actuated valve portions comprising the brake valve device. As shown in FIG. 2, these valve portions include a relay valve device 1a and a regulating valve device 1b, which will be discussed in greater detail hereinafter.

An equalizing reservoir 3 connected to the brake valve contains control air at a pressure corresponding to the position of handle 2 between the release and full service positions of the service brake application zone through which handle 2 may be moved to vary the intensity of a service brake application. A main reservoir 4 also connected to brake valve 1 is charged with fluid pressure from a compressor (not shown) in a manner which maintains the pressure therein within a preselected range above the train operating pressure. This pressure in main reservoir 4 is used to charge the equalizing reservoir 3 via regulating valve device 1b and to charge a train brake pipe 5 via relay valve device 1a in a well known manner. Brake pipe 5 extends uninterrupted from brake valve device 1 at the locomotive through each car of the train to the caboose.

Associated with the handle 2 of brake valve device 1 is an encoder device 7, which may be in the form of a conventional multi-channel, rotary wafer switch which converts the rotary position of handle 2 into a binary code signal at wires 8 representative of the position of brake valve handle 2. The number of bits comprising the code signal at wires 8 determines the degree of resolution obtained in translating the handle position. With a four bit code signal, as represented by wires 8, 16 discrete code signals are available. In that brake valve device 1 is designed to produce a 24 psi. reduction of brake pipe pressure in response to rotation of handle 2 from release position to full service position, successive code signals represent a change in pressure of approximately 1.5 psi.

The code signal at wires 8 is fed to a coding unit 9 having logic which interprets the digital condition of wires 8 and converts this code signal into the proper form for use by a transceiver 10. A radio signal is transmitted via transceiver 10 corresponding to whichever one of the 16 available code signals is instantaneously produced in accordance with the position of brake valve handle 2.

The caboose equipment includes a transceiver 10' and coding unit 9' similar to the corresponding devices comprising the locomotive equipment. Transceiver 10' is arranged to receive the radio signals transmitted by transceiver 10, with coding unit 9' having logic circuitry designed to interpret the received signals in terms of providing a four bit, binary coded brake command signal, as formed by the digital state of its output wires 11. The brake command signal thus represents the position of brake valve handle 2.

Figure 3:
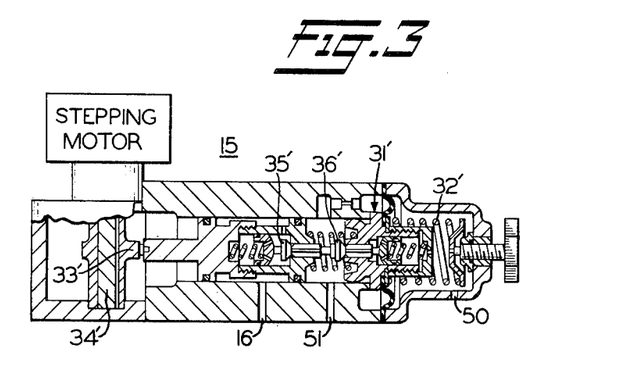
FIG. 3 is a sectional view of one form of regulating valve device similar to the regulating valve portion of FIG. 2, but arranged for operation by a stepping motor.

Wires 11 are connected to a comparator 12 having output wires 13, the combined digital state of wires 13 forming a binary code difference signal corresponding to the difference between the binary coded brake command signal effective at wires 11 and a binary coded feedback signal at wires 14 representing different pressure setting positions of a regulating valve device 15 to which brake pipe 5 is connected at a supply port 16. Only the least significant bit of the code signal at output wires 13 is utilized to drive a conventional bi-directional stepping motor 17 that is connected to the camshaft 34' of regulating valve device 15, as shown in FIG. 3. An encoder device 7' similar to encoder 7 senses the degree of rotation of the regulating valve camshaft 34' and generates a five bit binary code signal at wires 18, which is fed back to comparator 12 via a comparator 19 and wires 14. The purpose in encoder 7' providing a five bit code signal is to maintain the previously mentioned 1.5 psi. change between successive code signals in light of the fact that regulating valve 15 utilizes a cam 33' having 120° rotation, as opposed to the cam 33 of brake valve device 1 having 60° rotation, as hereinafter explained. This is possible since in a five bit code, 32 distinct code signals are available, as opposed to the 16 distinct code signals available in a four bit code. The least significant bit of the code signal formed at wires 13 is connected to the non-inverted input of an AND gate 20 whose inverted input is connected to the output of a NOR gate 21. The inputs of NOR gate 21 are in turn connected to wires 11 of coding unit 9' to detect whether the transmitted brake command signal is a brake release or brake application. Assuming wires 11 are each in a logical "0" state only when a brake release command is received, then the output of NOR gate 21 becomes a logical "1" to disable AND gate 20. It follows therefore that when brake valve 1 is moved out of release position toward brake application, at least one of the wires 11 will become a logical "1", thus causing NOR gate 21 to provide a logical "0" output and thereby enable AND gate 20. The output of AND gate 20 is connected to a control input 61 of a logic circuit 22 to activate the logic circuit which controls operation of stepping motor 17 so long as the non-inverted input of AND gate 20 is concurrently supplied with a logical "1" signal from the least significant bit of the difference code signal at comparator 12. The polarity of this difference code signal is reflected in the digital condition of a wire 23, which determines the direction the stepping motor 17 will rotate regulating valve 15 when activated. Wire 23 is connected from comparator 12 to one input of an AND gate 24 and to an inverted input of an AND gate 25. The other input of AND gates 24 and 25 is connected to the output of a NOR gate 27 whose inputs are provided by way of an initialization circuit 28, hereinafter explained. The output of AND gate 24 acts through an OR gate 29 to provide a control signal at directional input CCW of logic circuit 22, while the output of AND gate 25 acts through an OR gate 30 to provide a control signal at directional input CW of logic circuit 22. These inputs CCW and CW determine the direction logic circuit 22 causes stepping motor 17 to rotate.

Brake valve device 1, although conventional and well known to those skilled in the art of railway braking, is nevertheless shown in sufficient detail in FIG. 2 to permit a brief review of the operation of relay valve portion 1a and regulating valve portion 1b.

Regulating valve portion 1b of brake valve device 1 comprises a self-lapping valve assembly 31 which is subject to a control spring 32 acting on one side of the valve assembly control piston. The opposite side of the control piston is subject to equalizing reservoir pressure via passage 3a. A cam 33 connected to brake valve handle 2 by a camshaft 34 on which encoder 7 may be suitably mounted adjusts the position of the valve assembly 31 and thus establishes the degree of compression of spring 32 by the opposing equalizing reservoir pressure that is required to produce a lap condition of the self-lapping valve assembly. The contour of cam 33 is such as to afford a linear variation in equalizing reservoir pressure through a range of approximately 60° handle rotation corresponding to the service brake application zone. As the position of valve assembly 31 is thus varied by rotating cam 33 via handle 2, main reservoir pressure is either supplied to the equalizing reservoir 3 via passage 4a, a supply valve 35 of valve assembly 31 and passage 3a or equalizing reservoir pressure is vented via exhaust valve 36 until a force balance exists across the valve assembly to effect a lap condition thereof, in which both the supply valve and exhaust valve are closed. With handle 2 in release position, a screw 37 may be adjusted to obtain spring tension sufficient to produce equalizing reservoir pressure corresponding to the desired train operating pressure.

The pressure developed in equalizing reservoir 3 in accordance with the foregoing is connected via a branch passage 3b to the control piston 39 of a self-lapping valve assembly 40 comprising relay valve portion 1a. The pressure in brake pipe 5 is connected via passage 5a to the opposite side of control piston 39 and acts thereon in opposition to the equalizing reservoir pressure. As equalizing reservoir pressure is varied by movement of brake valve handle 2, a force imbalance occurs across piston 39 to activate valve assembly 40 and thereby either connect main reservoir pressure in passage 4a past supply valve 43 to brake pipe 5 via passage 5a or to vent the brake pipe pressure via passage 5a and exhaust valve 44 until a force balance is restored across control piston 39. When this occurs, valve assembly 40 assumes a lap condition in which both the supply valve and exhaust valve are closed. In this manner, brake pipe pressure is varied with variations in equalizing reservoir pressure brought about by movement of the brake valve handle.

INITIAL CHARGING

It will be appreciated now that in initially charging the system, brake valve handle 2 is placed in release position in which regulating valve 1b is operative to connect pressure from main reservoir 4 to equalizing reservoir 3 until equalizing reservoir pressure is developed in accordance with the tension to which control spring 37 is adjusted. The equalizing reservoir pressure in turn acts on relay valve device 1a to control the charging of brake pipe 5 from the pressure in main reservoir 4 until brake pipe presure corresponds to the equalizing reservoir pressure, which is the train operating pressure.

At the caboose, brake pipe pressure at supply port 16 of regulating valve device 15 may be connected to exhaust port 50 or to delivery port 51 thereof, depending upon the position in which regulating valve 15 had been previously set by stepping motor 17. Regulating valve device 15 is substantially the same as regulating valve portion 1b of brake valve device 1, with like parts being identified with identical reference numerals distinguished by a prime mark and should therefore require no further explanation except to note that stepping motor 17 replaces handle 2 on camshaft 34' and cam 33' is modified to provide linear variation of delivery pressure through a range of 120° of cam rotation, as opposed to 60° of cam rotation of regulating valve portion 1b. In that the encoder 7' provides a five bit output code signal, it will be appreciated that successive code changes reflect a 1.5 psi. pressure change in the setting of regulating valve 15. This corresponds with the brake valve pressure change of 1.5 psi. for the successive code signals at wires 8 of encoder 7.

Initialization circuit 28 is intended to provide a means of detecting the gradient condition of the brake pipe pressure, that is, the difference in pressure between the brake pipe at the locomotive and the brake pipe at the caboose. This is desirable in order to properly adjust the release position of regulating valve 15 to a setting corresponding to the level of brake pipe pressure effective at the caboose when the brake pipe is fully charged. Knowledge of this proper setting is achieved by means of a flow detector switch 52 in the exhaust line leading from exhaust port 50 of regulating valve device 15. Any time brake pipe pressure at supply port 16 exceeds the pressure for which the regulating valve is set, a delivery port 51 to which an equalizing reservoir 3' is connected is cut off from brake pipe supply via port 16 and is concurrently connected to exhaust port 50. When brake pipe pressure is below a value for which regulating valve 15 is set, equalizing reservoir pressure at delivery port 51 is cut off from exhaust port 50 and is concurrently connected to brake pipe pressure at supply port 16. Normally, this latter condition will exist during the initial charging of the brake pipe. Accordingly, the pressure in the brake pipe provides the source of air to charge equalizing reservoir 3', thus eliminating the need for a compressor or the like on the caboose.

A relay valve device 52 on the caboose is similar to the relay valve portion 1a of brake valve device 1 shown in FIG. 2. The control piston or relay valve 52 is subject to the pressure to which equalizing reservoir 3' is charged. This pressure is supplied via control port 53 of relay valve 52, while a delivery port 54 is subject to the caboose brake pipe pressure. The pressure at port 54 acts on the relay valve control piston in opposition to equalizing reservoir pressure at control port 53. Since the equalizing reservoir pressure at the caboose is charged from the brake pipe pressure, it follows that these pressures are substantially equal so that relay valve 52 assumes its lap position during brake pipe charging. Consequently, the relay valve exhaust port 55 is cut off from delivery port 54 to prevent any exhaust of brake pipe pressure during charging.

Concurrent with brake pipe charging as discussed in the foregoing, the release condition of brake valve 1 is monitored by encoder 7 and a corresponding radio signal is transmitted via transceiver 10. The transmitted signal is received at the caboose and converted to the appropriate binary code at wires 11 corresponding to a brake release command. NOR gate 21 is responsive to this release code signal to disable AND gate 20, as previously explained, to suppress operation of the stepping motor, at this time, by the remote control communication system.

However, initialization circuit 28 may be activated at the time of initial charging of brake pipe pressure by closing a manual switch 56, which feeds a signal to the set input S of a flip/flop device 57. In its set condition, the flip/flop output becomes a logical "1". This signal is connected to a non-inverted input of an AND gate 58 having an inverted input connected to the output of flow detector switch 52. As previously mentioned, regulating valve 15, during initial charging, can be expected to be in a position calling for a greater pressure than the brake pipe is providing. Fluid pressure at delivery port 51 is accordingly cut off from exhaust port 50, causing flow detector switch 52 to register a logical "0" output. Accordingly, AND gate 58 is enabled, while another AND gate 59 subject to the output of flow detector switch 52 at a non-inverted input is concurrently disabled. A second non-inverted input of AND gate 59 is subject to the output of NOR gate 21 via wire 57. This signal holds AND gate 59 in a disabled state any time a brake release signal is received at the caboose, as reflected in the code signal effective at wires 11 and monitored by NOR gate 21.

In its enabled state, AND gate 58 activates a pulse generator device 60 whose output is connected to the CCW input of logic circuit 22 via OR gate 30 and also to the control input 61 of circuit 22 via NOR gate 27, a signal inverter 62 and diode 63. Logic circuit 22 is accordingly conditioned to effect intermittent operation of stepping motor 17 in a counterclockwise direction under control of initialization circuit 28.

Stepping motor 17 may be a well-known synchronous induction type having a magnetic rotor and a multi-pole stator structure arranged so that by switching the polarities of successive stator poles, the rotor is attracted to the successive poles in precise increments of rotation to obtain the characteristic motor stepping action. Switching control of the stator pole polarities is obtained by way of a plurality of wires represented by output 68 of logic circuit 22. In the present example, the rate of polarity switching and thus the rate at which the motor is indexed is determined by the output frequency of pulse generator 60 and the logic of circuit 22.

Stepping motor 17 is thus operated in a counterclockwise direction to in turn rotate the camshaft 34' (FIG. 3) of regulating valve device 15 in a direction in which its output pressure setting is progressively reduced. When this setting of regulating valve 15 corresponds to a pressure below that which is effective at brake pipe supply port 16, brake pipe pressure will begin to exhaust via port 50 and flow detector switch 52. Consequently, AND gate 58 will be disabled and AND gate 59 concurrently enabled, by reason of the output of flow detector switch 52 becoming a logical "1". Also, flip/flop 57 is reset by the flow switch output to maintain AND gate 58 disabled until manual switch 56 is subsequently actuated.

With AND gate 59 now enabled, a pulse generator 64 provides an intermittent output signal to the CW directional input of logic circuit 22 via OR gate 30 and concurrently to control input 61 via NOR gate 27, signal inverter 62 and diode 63. Consequently, stepping motor 17 is operated in the opposite direction to effect rotation of camshaft 34' of regulating valve device 15 in a direction in which its output pressure setting is increased. In response to motor 17 establishing this new pressure setting at a value somewhat higher than the previous setting, exhaust valve 36' of regulating valve 15 is closed to terminate exhaust of pressure via flow switch 52, thereby disabling AND gate 59 and pulse generator 64.

In order to perpetuate operation of regulating valve device 15, which is in a lap condition when exhaust valve 36' closes and AND gate 59 is disabled, the duration of each pulse signal emitted by pulse generator 64 is selected to assure operation of stepping motor 17 for a duration sufficient to force regulating valve 15 to a higher pressure setting, whereupon the self-lapping valve assembly is positioned to open supply valve 35' and establish further charging of equalizing reservoir 3' via delivery port 51.

Accordingly, successive periods of motor stepping action establish progressively higher pressure settings of the regulating valve as charging of brake pipe 5 proceeds, so that the regulating valve pressure setting closely corresponds to the instantaneous pressure to which equalizing reservoir 3' is charged.

When brake pipe 5 reaches maximum charge, valve assembly 31' of regulating valve device 15 remains in its supply position in which supply valve 35' is open and exhaust valve 36' is closed. From the foregoing, it should now be apparent that equalizing reservoir 3' is charged to the brake pipe pressure effective at the caboose via regulating valve 15, the pressure setting of which is intermittently adjusted to follow the charging of brake pipe pressure in a stepped sequence so as to assume a final setting closely corresponding to the brake pipe pressure at the caboose. In that encoder 7' monitors the degree of rotation of the regulating valve camshaft 34', wires 18 at the encoder output provide a means of monitoring the brake pipe gradient.

The encoder output signal is connected to a memory block 65 to which the output of flow detector switch 52 is also connected via wire 66. The input code fed to memory block 65 is periodically updated when the output of flow switch 52 becomes a logical "1" with the last previous code update being maintained by a logical "0" condition of wire 66. Thus, with brake pipe 5 fully charged and exhaust valve 36' of regulating valve 15 closed, as above explained, flow switch 52 produces a logical "0" output to maintain the last previous code signal at wires 67 of memory block 65. This memory output at wires 67 is compared at comparator 19 to the encoder output at wires 18. At this point, the code signals at wires 18 and 67 correspond and consequently the feedback code signal at wires 14 of comparator 19 indicates that the regulating valve pressure setting matches the pressure setting of the locomotive brake valve 1, as provided by regulating valve portion 1b thereof, although the final setting of regulating valve device 15 corresponds to the caboose brake pipe pressure and thus actually differs from the setting of regulating valve 1b of locomotive brake valve device 1 by an amount corresponding to the brake pipe pressure gradient. The purpose for this initialization process, which is now complete, will hereinafter become apparent.

BRAKE APPLICATION

When a subsequent brake application is initiated from the locomotive by movement of brake valve handle 2 out of brake release position into the service application zone, the position of camshaft 34 of regulating valve 1b is monitored by encoder 7, interpreted and converted into the appropriate form for transmission via transceiver 10. This brake application signal is received at the caboose via transceiver 10' and fed to comparator 12 via coding unit 9' in the form of a code signal representative of the position of rotation of brake valve camshaft 34 into the service brake application zone. Upon moving brake valve handle 2 out of release position, at least one bit of the code signal formed at output wires 11 become a logical "1" to disable NOR gate 21, whose output also acts via wire 59 to disable AND gate 59 of initialization circuit 28. Since AND gate 58 had previously been disabled by reason of flip/flop 57 having been reset during the initialization process, further control of logic circuit 22 by initilization circuit 28 is supressed.

Concurrently, AND gate 20 is enabled by the output of NOR gate 21 to effect operation of logic circuit 22 so long as a logical "1" condition of the least significant bit of the code signal effective at output wires 13 of comparator 12 exists. The directional input signal to logic circuit 22 is provided via wire 23 and assumes a logical "1" condition, since the brake application command at wires 11 represents a position of brake valve handle 2 that produces brake pipe pressure at a value below that for which regulating valve 15 is set during initilization, as represented by the feedback signal effective at wires 14. Consequently, the CCW input of logic circuit 22 is energized via OR gate 29 and AND gate 24, the latter being enabled by the output of NOR gate 27 when initialization circuit 28 is inoperative. Stepping motor 17 is accordingly operated in a counterclockwise direction to effect rotation of camshaft 34' and cam 33' of regulating valve 15 (FIG. 3). Encoder 7' monitors this rotation of camshaft 34', accordingly changing its output code signal, which is compared at comparator 19 with the stored code signal provided by memory block 65 representing the regulating valve pressure setting following completion of the initilization process. The output of comparator 19 thus reflects the difference between the setting of the regulating valve following initial charging and the instantaneous regulating valve setting during a subsequent brake application, thereby providing a feedback code signal via wires 14 which will assure continued stepped operation of motor 17 until camshaft 34' of regulating valve device 15 is rotated to a position beyond that corresponding to the position of brake valve device 1 by an amount determined by the pre-set position of regulating valve 15 during initialization.

When the feedback signal at wires 14 conforms with the input brake application command signal at wires 11, comparator 12 will produce an output code signal wherein each of the wires 13 assumes a logical "0" state, including the least significant bit of the output code signal, which disables AND gate 20 and thereby interrupts operation of logic circuit 22 to terminate further operation of stepping motor 17 until a further brake command signal is received via transceiver 10'.

Cams 34' of the locomotive regulating valve 1b and caboose regulating valve 15 are each rotated a corresponding number of degrees from their release and pre-set positions respectively. Since cams 34' provide a linear pressure change through their full range of operation, it will be apparent that corresponding pressure changes are provided at the locomotive and caboose equalizing reservoirs 3 and 3'.

Regulating valve 15 operates in response to rotation of its camshaft in a counterclockwise direction to exhaust pressure from equalizing reservoir 3' via delivery port 51 and exhaust port 50 until the equalizing reservoir pressure is reduced to the pressure setting of the regulating valve, as established by motor 17. In response to this reduction of equalizing reservoir pressure, control pressure at port 53 of relay valve device 52 (equalizing reservoir pressure) is accordingly reduced to cause the relay valve to exhaust brake pipe pressure at port 54 to atmosphere via exhaust port 55 until the reduction of brake pipe pressure at the caboose corresponds to the reduction of pressure at equalizing reservoir 3'. Since the reduction of pressure at equalizing reservoir 3' corresponds to the reduction of equalizing reservoir pressure at reservoir 3 of the locomotive in accordance with the foregoing explanation relative to initiating a brake application, it will now be apparent that the brake pipe pressure reductions at the locomotive and at the caboose are not only synchronized, but are also identical irrespective of the brake pipe pressure gradient. Since the train brakes are controlled in accordance with variations in the brake pipe pressure in a well known manner, it will be apparent that faster more uniform brake response coupled with more equalized brake forces along the train will result from the present invention. Moreover, these functions are obtained without the need for an air compressor or the like to charge the caboose equalizing reservoir.

BRAKE RELEASE

When brake valve handle 2 is moved to release position to initiate a direct release of the brakes in a well known manner, the position of handle 2 is monitored by encoder 7 and transmitted in code form via transceiver 10 and received by the caboose transceiver 10'. Caboose coding unit 9' interprets the received signal and forms at its output wires 11 a brake release command code signal which differs from the feedback code signal at wires 14 representing instantaneous pressure setting of regulating valve device 15. However, AND gate 20 is disabled by the output of NOR gate 21 when a brake release command exists at wires 11, thus interrupting control of stepping motor 17 via comparator 12.

Stepping motor 17 and thus regulating valve 15 are driven instead by initialization circuit 28, as previously explained under the heading "Initial Charging". During this brake release operation, the output of flow switch 52 will periodically enable memory circuit 65 to update its stored gradient signal via wire 66, as the regulating valve pressure setting changes with the increasing brake pipe pressure in order to reflect the final pressure setting according to the brake pipe pressure effective at the caboose, which normally differs from the locomotive brake pipe pressure as a result of leakage.

BRAKE APPLICATION WITH FALSE BRAKE PIPE GRADIENT

In the event a brake application is initiated at the time false brake pipe gradient exists, that is, before the brake pipe pressure at the caboose is able to build up to its normal pressure, regulating valve 15 will be operated to effect a reduction of pressure at equalizing reservoir 3' corresponding to the pressure reduction at the locomotive equalizing reservoir 3, by reason of the feedback signal from the gradient memory block 65 providing an indication of the level of caboose brake pipe pressure and thus the setting of regulating valve 15 at the time the brake application is initiated. Relay valve device 52 thus responds to the reduction of pressure at equalizing reservoir 3' to exhaust the caboose brake pipe pressure accordingly. In that brake valve device 1 is a maintaining type brake valve in the sense that it continuously attempts to supply or exhaust brake pipe pressure as necessary to match the control pressure of equalizing reservoir 3, it will be understood that due to the brake pipe gradient between the locomotive and caboose, brake valve device 1 will supply pressure to brake pipe 5. If this maintaining pressure were able to overcome the pressure gradient, which it attempts to do, then obviously the brake pipe pressure increase along the train would cause the train brakes to be inadvertently released. In the present invention, however, relay valve 52 prevents a pressure buildup in the brake pipe in excess of the caboose equalizing reservoir pressure, thus preserving the false pressure gradient existing at the time of the brake application to prevent any inadvertent release of the train brakes.

Having now described the invention, what I claim as new and desire to secure by Letters Patent, is:

1. A remote control system for varying fluid pressure carried in a brake pipe extending continuously through a railway train having a locomotive at which one end of said brake pipe is terminated and a caboose at which the other end of said brake pipe is terminated to thereby obtain faster, more accurate synchronized control of the brakes of said train, said system comprising:
   a. a main reservoir charged with fluid under pressure;
   b. a first equalizing reservoir;
   c. a first pressure regulating valve device to which said first equalizing reservoir and said main reservoir are connected, and having a cam member in response to rotation of which said first regulating valve device is operable to supply fluid pressure from said main reservoir to said equalizing reservoir and to release fluid pressure therefrom;
   d. a first relay valve device to which said one end of said brake pipe, said main reservoir and said first equalizing reservoir are connected, said first relay valve device being operative responsively to the variation of pressure in said first equalizing reservoir to supply fluid pressure from said main reservoir to said brake pipe at said one end and to release fluid pressure therefrom;
   e. first encoder means for providing a brake control signal according to the position in which said cam member of said first regulating valve device is rotated;
   f. means for transmitting said brake control signal;
   g. means for receiving said transmitted brake control signal at said caboose;
   h. a second equalizing reservoir;
   i. a second pressure regulating valve device to which said other end of said brake pipe and said second equalizing reservoir are connected and having a cam member in response to rotation of which said second regulating valve device is operable to supply fluid pressure from said other end of said brake pipe to said second equalizing reservoir and to release fluid pressure therefrom;
   j. motor means for effecting rotation of said cam member of said second regulating valve device;
   k. second encoder means for providing a feedback signal corresponding to the position in which said cam member of said second regulating valve device is rotated;
   l. first comparator means for effecting operation of said motor means when a difference exists between said brake control signal and said feedback signal; and
   m. a second relay valve device to which said other end of said brake pipe and said second equalizing reservoir are connected, said second relay valve device being operative responsive to variation of pressure in said second equalizing reservoir to effect release of fluid pressure from said other end of said brake pipe accordingly.

2. A remote control system as recited in claim 1, wherein said first and second encoder means provide said brake control signal and said feedback signal respectively in the form of a multi-bit, binary code signal, each distinctive code thereof representing a different position of said cam members of said first and second regulating valve devices, respectively.

3. A remote control system as recited in claim 2, wherein said first comparator means provides a multi-bit, binary code error signal according to the difference between said brake control signal and said feedback signal, the presence of the least significant bit of said error signal effecting operation of said motor means.

4. A remote control system as recited in claim 3, wherein said motor means comprises:
   a. an electric motor; and
   b. a motor control circuit having an input to which the least significant bit of said error signal is connected to effect operation of said electric motor.

5. A remote control system as recited in claim 4, wherein:
   a. said first comparator means is further provided with a digital output signal, the logical state of which reflects the sense of said error signal; and
   b. said motor control circuit having a pair of directional inputs subject to said digital output signal to control the direction in which said electric motor is operated; and
   c. means for inverting said digital output signal leading to one of said directional inputs.

6. A remote control system as recited in claim 4, wherein said electric motor is a stepping type motor and said motor control circuit includes logic circuit means for effecting intermittent operation of said stepping motor.

7. A remote control system as recited in claim 1, further comprising initialization means for effecting operation of said motor means when the instantaneous setting of said second regulating valve device corresponds to a pressure that differs from the pressure effective at said other end of said brake pipe.

8. A remote control system as recited in claim 7, wherein said motor means comprises:
   a. an electric stepping motor; and
   b. a motor control circuit having an input to which said first comparator means and said initialization means are connected for effecting operation of said stepping motor.

9. A remote control system as recited in claim 8, wherein:
   a. said first and second encoder means provide at the outputs thereof said brake control signal and said feedback signal respectively in the form of a multi-bit, binary code signal, each distinctive code thereof representing a different position of said cam members of said first and second regulating valve devices; and b. said first comparator means provides a multi-bit binary code error signal at an output thereof according to the difference between said brake control signal and said feedback signal, the presence of the least significant bit of said error signal effecting operation of said motor means.

10. A remote control system as recited in claim 9, further comprising disabling means for preventing said first comparator means from effecting operation of said motor means when said cam member of said first regulating valve device is in a predetermined positon and for preventing said initialization means from effecting operation of said motor means when said cam member of said first regulating valve device is in a position other than said predetermined position.

11. A remote control system as recited in claim 10, wherein said predetermined position of said cam member of said first regulating valve device is representative of said brake control signal being a brake release command.

12. A remote control system as recited in claim 10, wherein said disabling means includes:
  a. a NOR gate having each input connected to a respective bit of said brake control code signal and an output energized when said brake control code signal is representative of said cam member of said first regulating valve device being in said predetermined position; and
  b. a first AND gate having a non-inverted input connected to the least significant bit of said error signal provided by said first comparator, an inverted input connected to the output of said NOR gate and an output connected to said input of said control circuit.

13. A remote control system as recited in claim 12, wherein said initialization means comprises:
  a. fluid flow switch means for providing a flow signal responsive to exhaust of fluid pressure at said second regulating valve device when the pressure of said second equalizing reservoir exceeds the pressure for which said second regulating valve device is set; and
  b. a second AND gate having one input subject to said flow signal, another input subject to the output of said NOR gate and an output connecting a first initialization signal to said input of said control circuit.

14. A remote control system as recited in claim 13, wherein:
  a. said first comparator means is further provided with a digital output signal, the logical state of which reflects the sense of said error signal;
  b. said control circuit having a pair of directional inputs subject to said digital output signal to control the direction in which said motor is operated;
  c. means for inverting said digital output signal leading to one of said directional inputs; and
  d. said output of said second AND gate connecting said first initialization signal to said one of said directional inputs in parallel with said digital output signal.

15. A remote control system as recited in claim 14, wherein said one of said directional inputs when energized causes said motor control circuit to operate said motor in a direction to increase the pressure setting of said second regulating valve device.

16. A remote control system as recited in claim 15, wherein said initialization circuit further comprises pulse generator means for providing said first initialization signal for a limited duration following termination of said flow signal.

17. A remote control system as recited in claim 14, further comprising:
  a. memory means for providing a multi-bit, binary code gradient signal corresponding to the final position of said cam member of said second regulating valve device when the pressure setting thereof corresponds to a pressure at least as great as the pressure to which said other end of said brake pipe is charged prior to a brake application; and
  b. second comparator means for modifying said feedback signal according to said gradient signal of said memory means.

18. A remote control system as recited in claim 17, wherein:
  a. said memory means comprises a data input connected to the output of said second encoder means, a control input subject to said flow signal and an output on which is registered said gradient signal reflecting the instantaneous output of said second encoder means only at the time said first output signal is present; and
  b. said second comparator means comprises a first input to which said feedback signal is connected and a second input to which said gradient signal is connected to modify said feedback signal.

19. A remote control system as recited in claim 14, wherein said initialization means further includes:
  a. a flip-flop having an output, a set input and a reset input to which said flow signal is connected;
  b. switch means for connecting a source of energy to said set input to provide a start signal at said output of said flip-flop; and
  c. a third AND gate having a non-inverted input to which said start signal is connected, an inverted input to which said flow signal is connected and an output providing a second initialization signal to said input of said control circuit and to the other one of said directional inputs.

20. A remote control system as recited in claim 1, wherein said second regulating valve device comprises a supply port to which said other end of said brake pipe is connected, a delivery port to which said second equalizing reservoir is connected, an exhaust port and a self-lapping valve assembly via which said supply and delivery ports are connected when the setting of said second regulating valve device corresponds to a pressure exceeding the pressure of said second equalizing reservoir and via which said delivery and exhaust ports are connected when the pressure of said second equalizing reservoir exceeds a pressure for which said second equalizing reservoir is set.

* * * * *